United States Patent
Holzapfel et al.

(10) Patent No.: US 7,707,739 B2
(45) Date of Patent: May 4, 2010

(54) METHOD FOR ATTACHING A SCALE TO A CARRIER, A SCALE, AND CARRIER HAVING A SCALE

(75) Inventors: Wolfgang Holzapfel, Obing (DE); Joerg Drescher, Riedering (DE); Peter Speckbacher, Kirchweidach (DE); Josef Weidmann, Trostberg (DE); Wolfgang Pucher, Bergen (DE); Kilian Bauer, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 707 days.

(21) Appl. No.: 11/593,851

(22) Filed: Nov. 6, 2006

(65) Prior Publication Data

US 2007/0137059 A1 Jun. 21, 2007

Related U.S. Application Data

(60) Provisional application No. 60/737,079, filed on Nov. 15, 2005.

(30) Foreign Application Priority Data

Nov. 4, 2005 (DE) .................. 10 2005 053 088
Apr. 15, 2006 (DE) .................. 10 2006 017 708

(51) Int. Cl.
*G01D 5/347* (2006.01)
*G01D 5/38* (2006.01)
(52) U.S. Cl. ...................................................... 33/706
(58) Field of Classification Search ................. 33/701, 33/702, 706, 707, 708; 356/616, 617, 618, 356/620
See application file for complete search history.

(56) References Cited

U.S. PATENT DOCUMENTS

| | | | |
|---|---|---|---|
| 4,564,294 A * | 1/1986 | Ernst | 356/618 |
| 5,669,997 A | 9/1997 | Robbert et al. | |
| 5,877,903 A | 3/1999 | Adachi | |
| 6,099,193 A | 8/2000 | Hangleiter et al. | |
| 6,668,467 B2 * | 12/2003 | Shimomura et al. | 33/542 |
| 6,798,588 B2 | 9/2004 | Vogt | |
| 7,343,693 B2 * | 3/2008 | Mitchell et al. | 33/707 |
| 7,346,993 B2 * | 3/2008 | McMurtry et al. | 33/1 PT |
| 7,549,234 B2 * | 6/2009 | Holzapfel et al. | 33/706 |
| 2004/0263846 A1 | 12/2004 | Kwan | |
| 2007/0227027 A1 * | 10/2007 | Holzapfel et al. | 33/706 |

FOREIGN PATENT DOCUMENTS

DE 197 55 482 6/1999
DE 10 153 147 5/2003

OTHER PUBLICATIONS

Carol Click et al.: "SCHOTT Low Temperature Bonding for Precision Optics", 2004.
Search Report, European Patent Application No. 06018925.5, dated Mar. 5, 2007.

* cited by examiner

*Primary Examiner*—R. A. Smith
(74) *Attorney, Agent, or Firm*—Kenyon & Kenyon LLP (57) ABSTRACT

A scale is attached to a carrier by optically contacting. The optically contacting bonds are formed by raised surface regions of the scale set apart from each other. Additional measures, such as the provision of adhesive surfaces, provide a rigid and vibration-resistant joint.

17 Claims, 8 Drawing Sheets

METHOD FOR ATTACHING A SCALE TO A CARRIER, A SCALE, AND CARRIER HAVING A SCALE

CROSS-REFERENCE TO RELATED APPLICATIONS

The present application claims priority to Application No. 10 2005 053 088.5, filed in the Federal Republic of German on Nov. 4, 2005, claims priority to Application No. 10 2006 017 708.8, filed in the Federal Republic of German on Apr. 15, 2006 and claims the benefit of U.S. Provisional Application No. 60/737,079, filed on Nov. 15, 2005, each of which is expressly incorporated herein in its entirety by reference thereto.

FIELD OF THE INVENTION

The present invention relates to a method for attaching a scale to a carrier, a scale and a carrier having a scale.

BACKGROUND INFORMATION

To measure the relative position of two machine parts, a scale is attached to one of the machine parts, and a scanning unit is attached to the other of the machine parts movable relative to each other. During the position measuring, a graduation marking of the scale is scanned by the scanning unit.

A distinction is made between two basic principles when attaching a scale to a carrier. In the case of the first basic principle, the scale is attached to the carrier such that it is able to expand freely with respect to the carrier in response to temperature changes. In this case, fastening elements that are deflectable in the measuring direction, or an elastic adhesive layer are used for the attachment.

In the case of the second basic principle, the scale is rigidly attached to the carrier. In this instance, the carrier and the scale may be made of a material having the same expansion coefficient. If the carrier and the scale are made of different materials, the thermal characteristic of the carrier is forced on the scale. In the case of the second basic principle, the fastening is accomplished via thin, rigidly curing adhesive layers or by direct contact, such as optical contacting.

For highly accurate position measuring, scales made of glass or glass ceramic having a negligible expansion coefficient are used. These scales may be effectively machined, so that direct bonding on opposing surfaces is used, as described in German Published Patent Application No. 101 53 147.

The problem in direct bonding a scale is that the connection can easily be disturbed by impurities or the formation of air bubbles. Moreover, the joining surfaces must be very even, which requires great effort. These problems are amplified in the case of relatively large-area scales. For this reason, the direct bonding of scales has not gained acceptance.

SUMMARY

Example embodiments of the present invention may provide a method that eliminates the foregoing problems, and example embodiments of the present invention may provide a carrier having a scale firmly attached to it.

Example embodiments of the present invention utilize the attainable advantages of optically contacting, by applying surface forces as large as possible in the form of retaining forces but simultaneously may avoid the disadvantages of optically contacting bond, in that a plurality of optically contacting bond surfaces separate from one another are formed.

Local separation of the bond due to contamination or scratches is limited by the separation of the optically contacting bond surfaces. Generally, the separation does not propagate due to a broken bond.

In addition, satisfactory flatness of the scale may be achieved, since disruptive media may escape through the at least one channel leading to the outside.

According to example embodiment of the present invention, a method for attaching a scale to a carrier includes: producing an optically contacting bond between the scale and the carrier at a plurality of surface regions of the scale spaced apart from each other and separated from each other by at least one channel.

The optically contacting bond may be produced in the producing step by at least one of (a) direct bonding, (b) low-temperature bonding and (c) anodic bonding.

The optically contacting bond may be produced in the producing step at surface regions distributed in a two-dimensional grid and set apart from each other.

The surface regions may include projections having a mutual spacing of less than a thickness of the scale.

The method may include producing a further connection in addition to the optically contacting bond.

The further connection may include an adhesive joint, and the further connection producing step may include introducing an adhesive agent between the scale and the carrier.

According to an example embodiment of the present invention a device includes: a scale; and a carrier, the scale attached to the carrier by an optically contacting bond. The optically contacting bond is provided at a plurality of surface regions of the scale set apart from each other and separated from each other by at least one channel.

The surface regions may include projections provided on at least one of (a) the scale and (b) the carrier.

The projections may be positioned distributed in a two-dimensional grid.

The projections may have a mutual spacing of less than a thickness of the scale.

The scale and the carrier may be connected by a further connection in addition to the optically contacting bond.

The additional connection may include an adhesive joint, and an adhesive agent may be provided on adhesive surfaces between the scale and the carrier.

The adhesive surfaces may be separated from projections provided on at least one of (a) the scale and (b) the carrier by grooved depressions.

The carrier may directly contact the scale at the projections, the adhesive surfaces may be recessed with respect to the projections to provide a gap between the scale and the carrier adapted to receive the adhesive agent, and the grooved depressions may be recessed with respect to the adhesive surfaces.

The carrier may include at least one opening adapted for introduction of the adhesive agent onto the adhesive surface.

The adhesive surface may extend to an edge of at least one of (a) the scale and (b) the carrier and may be formed so that the adhesive agent travels by capillary force from the edge to adhesive surfaces arranged away from the edge.

The carrier may include a taper in a direction of an edge.

According to an example embodiment of the present invention, a scale includes: an attachment surface adapted for attachment to a carrier, the attachment surface including projections set apart from each other, each projection including an optically contactable surface adapted to produce an optically contacting bond to an opposing surface of the carrier.

The projections may be positioned distributed in a two-dimensional grid.

The projections may have a mutual spacing of less than a thickness of the scale.

Further aspects and features of example embodiments of the present invention are described in more detail below with reference to the appended Figures.

DETAILED DESCRIPTION

Figure 1:
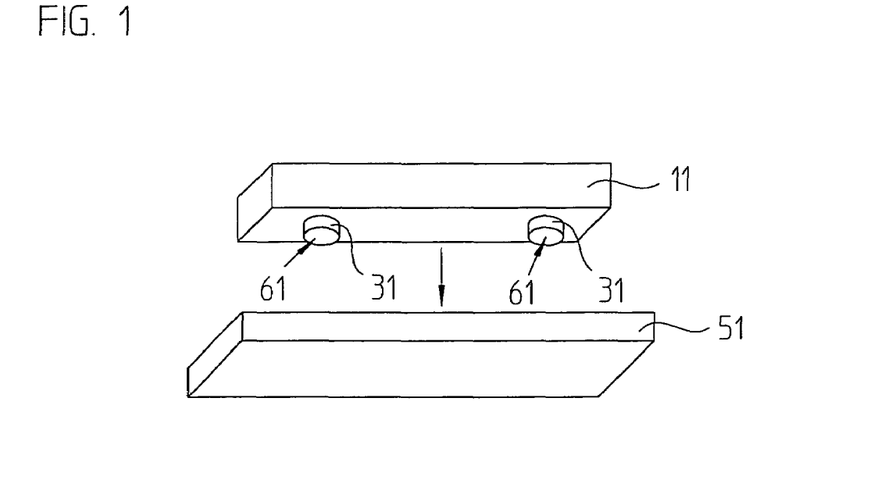
FIG. 1 illustrates a first scale and a first carrier for attachment of the scale.
Figure 2:
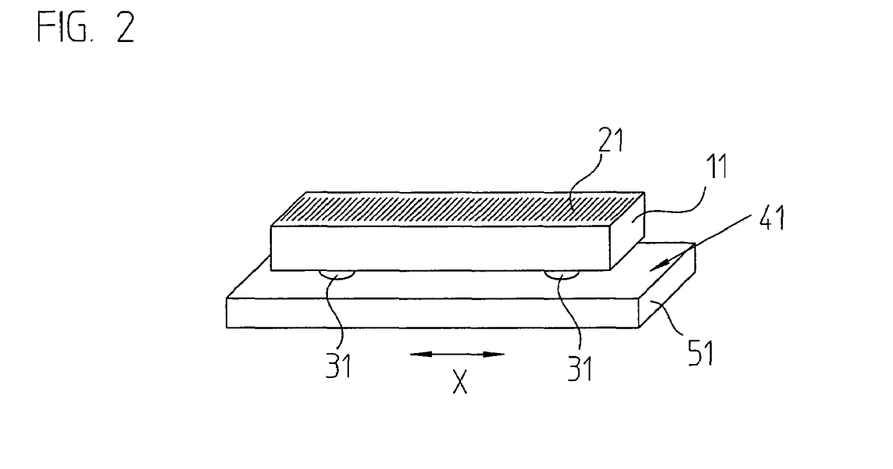
FIG. 2 illustrates the scale illustrated in FIG. 1 attached to the carrier.
Figure 3:
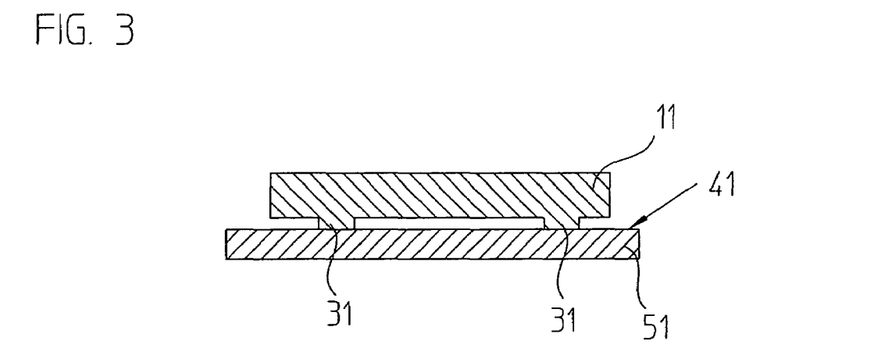
FIG. 3 is a longitudinal cross-sectional view of the scale and the carrier illustrated in FIG. 2.

Referring to FIGS. 1 through 3, a glass or glass-ceramic (e.g., ZERODUR) scale 11 having a measuring graduation marking 21 is illustrated. Measuring graduation marking 21 is an incremental graduation marking able to be scanned for position measuring in measuring direction X. Measuring graduation marking 21 may be a reflecting amplitude or diffraction grating or a phase grating which is used, e.g., in a conventional manner, for highly accurate, interferential position measuring. In the region of its Bessel points, scale 11 has projections 31 which are used as supports for placement onto an opposing surface 41 of a carrier 51. Carrier 51 may be made of glass or glass ceramic (e.g., ZERODUR), etc.

Surfaces 61 of projections 31 opposite to opposing surface 41 of carrier 51, as well as opposing surface 41, are clean surfaces polished to a high degree. The surface finish required is achieved by mechanical, abrasive polishing, chemical-mechanical polishing, etc.

Projections 31 on scale 11 may be produced by conventional patterning methods, by covering the regions of projections 31 and etching away the material around projections 31. Projections 31 are thus formed in one piece on scale 11.

Scale 11 is joined to carrier 51 by optically contacting the surfaces 61 of projections 31 to opposing surface 41 of carrier 51. The basis of the optically contacting is adhesion, as clean, conformable, and polished surfaces adhere to one another when their spacing enters the range of atomic bonding forces. Optically contacting is also referred to as optical bonding, non-adhesive bonding or wringing. Surfaces 61 of the projections are therefore formed such that they have an optically contactable surface 61 for producing an optically contacting bond with opposing surface 41 of carrier 51.

This optically contacting may be direct bonding (or direct contacting), which is also referred to as wringing and "Ansprengen" in German. In the case of direct bonding, the bonding action may be increased by the effect of heat, or by applying surface-active agents. Direct bonding using surface-active agents also achieves a good bonding strength at relatively low temperatures. A special type of surface-active agent is the introduction of crystallizing liquid. This optically contacting method is also referred to as low-temperature bonding technique (LTB) and is explained in a treatise from the firm SCHOTT, available over the Internet, having the title: "SCHOTT Low Temperature Bonding for Precision Optics" by Carol Click, Leo Gilroy and Dave Vanderpool, which is expressly incorporated herein in its entirety by reference thereto. When using the LTB method, scale 11 and carrier 51 are each made of glass ceramic having an expansion coefficient close to zero, e.g., ZERODUR.

The optically contacting may also be anodic bonding, in which on one of surfaces 61, 41 of scale 11 or carrier 51 to be joined together, a metallic, electroconductive auxiliary layer, e.g., aluminum, is applied as an intermediate layer between projections 31 and opposing surface 41. This auxiliary layer may be a vapor-deposited layer. In anodic bonding, a voltage is applied between the auxiliary layer and carrier 51, so that ions from the auxiliary layer migrate into carrier 51 and/or ions from carrier 51 migrate into the auxiliary layer. The applied voltage generates an electrostatic attractive force which brings about an atomic contact between the scale and the carrier.

Figure 4:
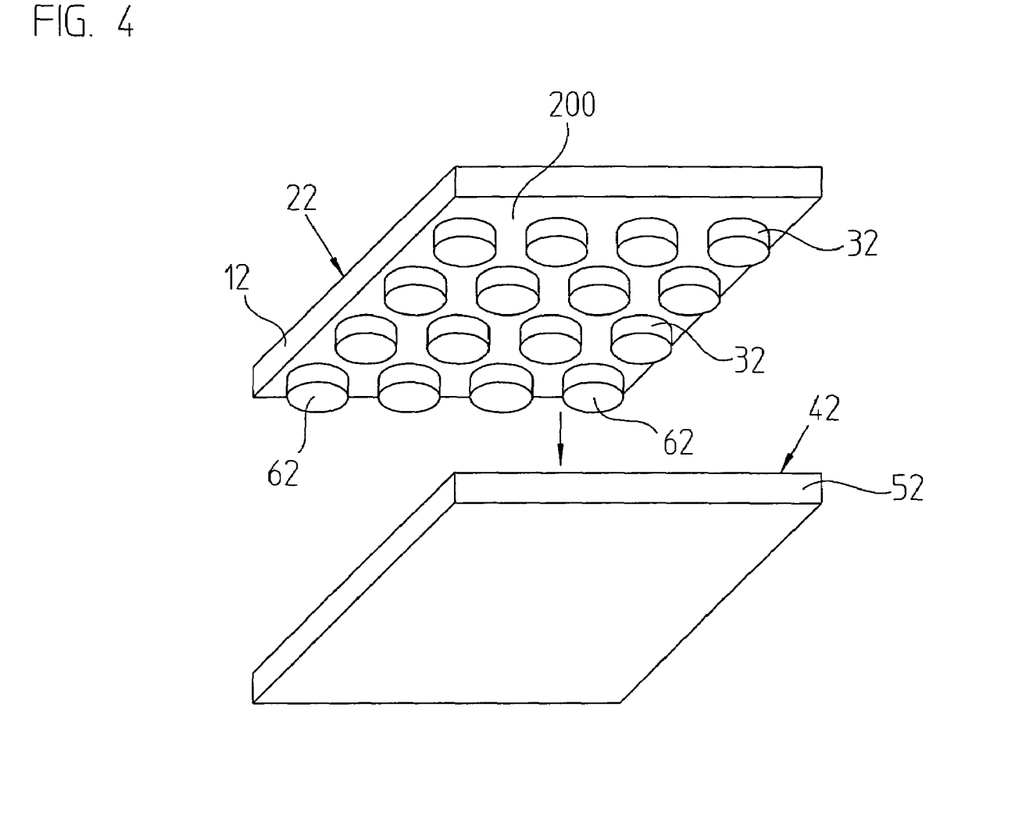
FIG. 4 illustrates a second carrier and a second scale.
Figure 5:
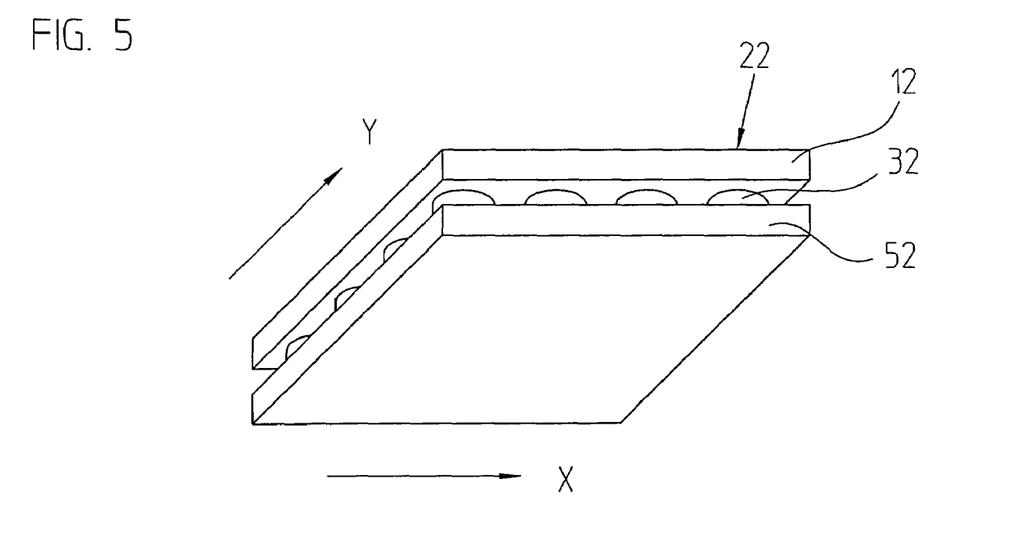
FIG. 5 illustrates the scale illustrated in FIG. 4 attached to the carrier.

Scales 12 having a two-dimensional measuring graduation marking 22 are increasingly being used for multi-dimensional position measuring. In that case, relatively large-sized scales 12 (e.g., 40 cm×40 cm) are mounted on a surface 42 of a machine part 52. Example embodiments hereof are suitable for lithographic devices, e.g., in which machine parts 52 on which scale 12 is to be mounted are made of glass ceramic (e.g., ZERODUR) having an expansion coefficient close to zero. Such a machine possessing a scale having a two-dimensional measuring graduation marking is described, for example, in U.S. Patent Application Publication No. 2004/0263846, which is expressly incorporated herein in its entirety by reference thereto.

It may be necessary to mount a plurality of scales 12 in two-dimensional fashion side-by-side like a mosaic on a machine surface 52 of 1 m×2 m, for example, in order to cover the requisite measuring region of approximately 1 m×2 m. This is because scales 12 having, for example, a measuring graduation marking 22 able to be scanned photoelectrically are only able to be produced with the necessary precision in sizes of, e.g., approximately 40 cm×40 cm. Each of these scales 12 may be attached to carrier 52 as illustrated in the Figures described below.

The optically contacting methods explained above are used for this attachment.

Figure 11:
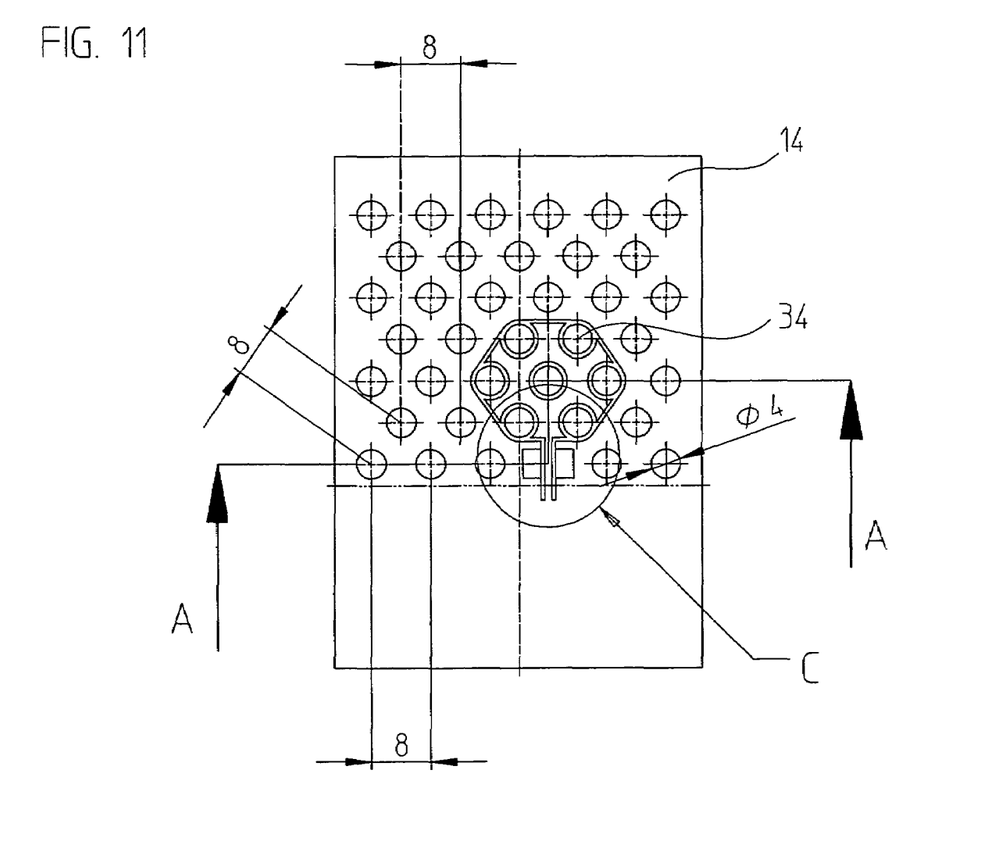
FIG. 11 is a top view of the fourth carrier and fourth scale.
Figure 12:
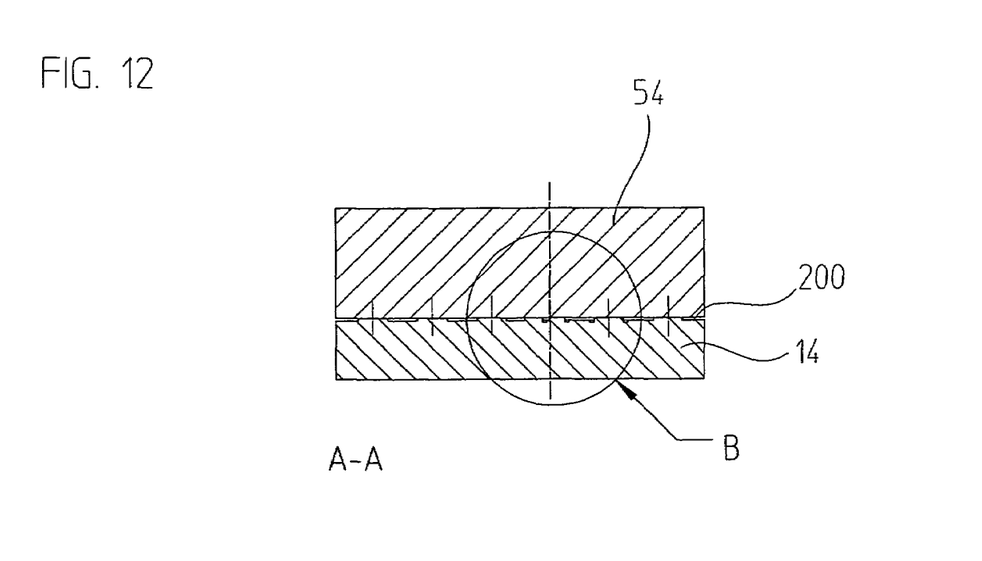
FIG. 12 is a cross-sectional view taken along the line A-A illustrated in FIG. 11.
Figure 13:
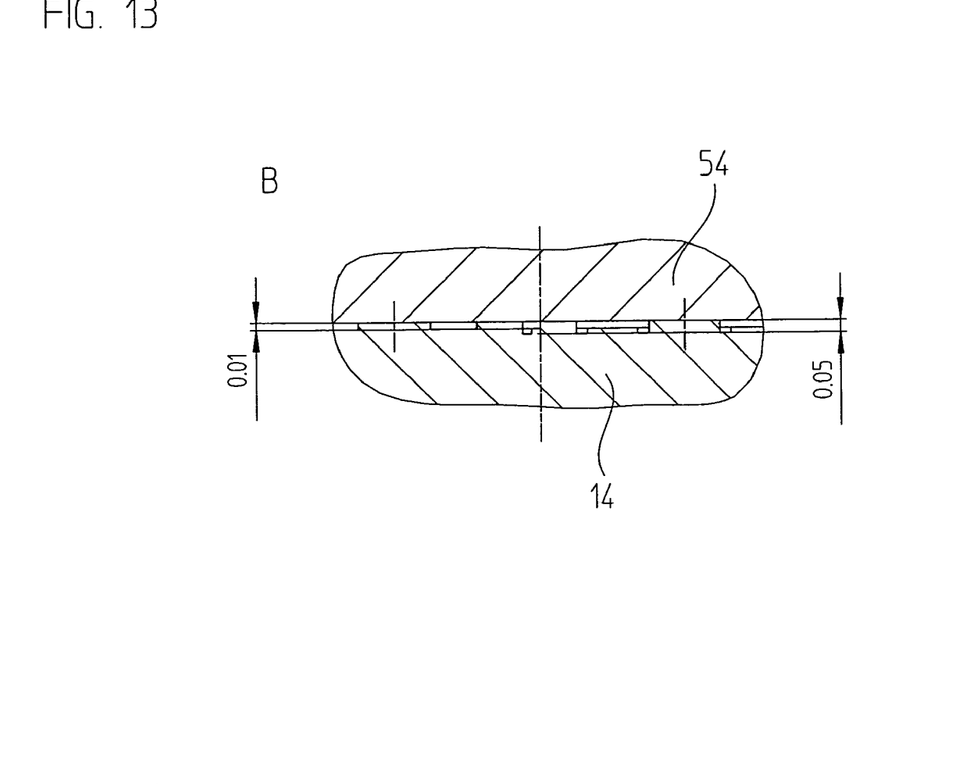
FIG. 13 is an enlarged view of region B illustrated in FIG. 12.
Figure 14:
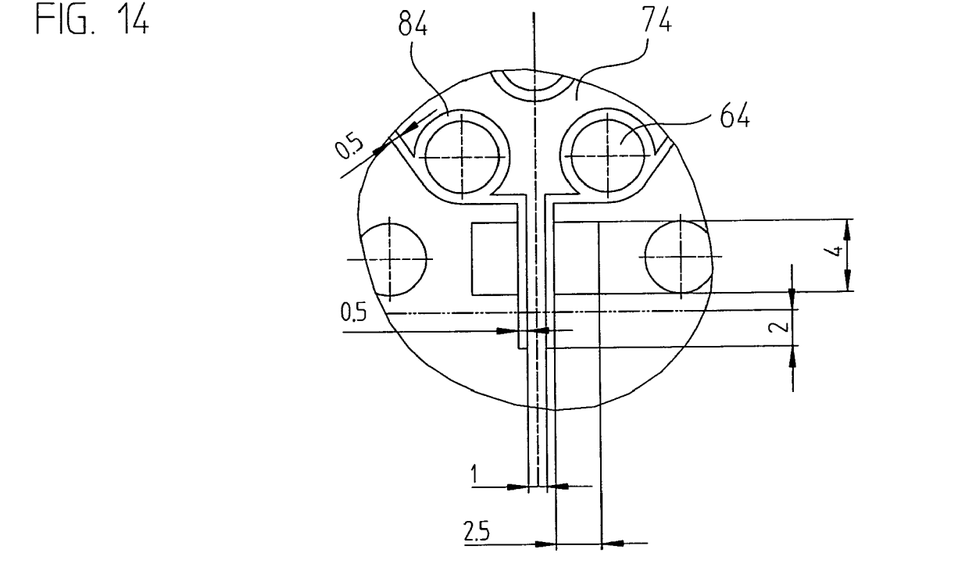
FIG. 14 is an enlarged view of region C illustrated in FIG. 11.
Figure 16:
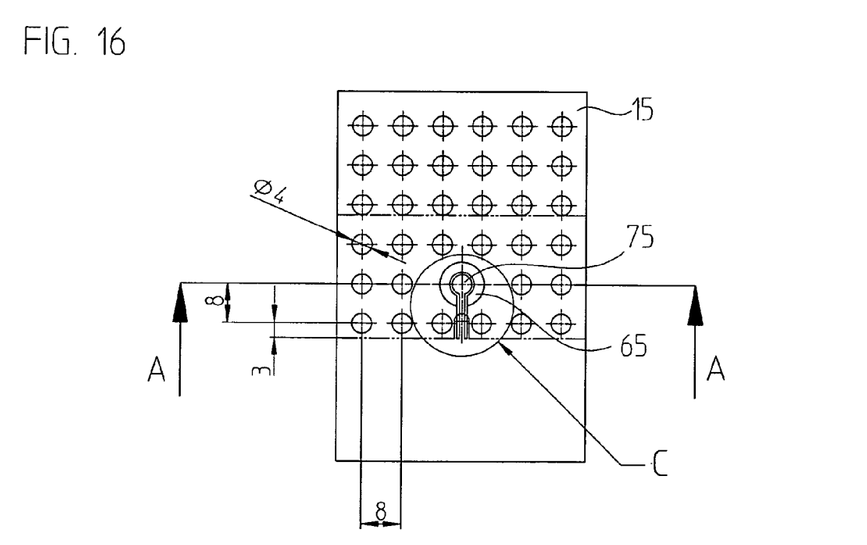
FIG. 16 is a top view of the fifth carrier and fifth scale.
Figure 17:
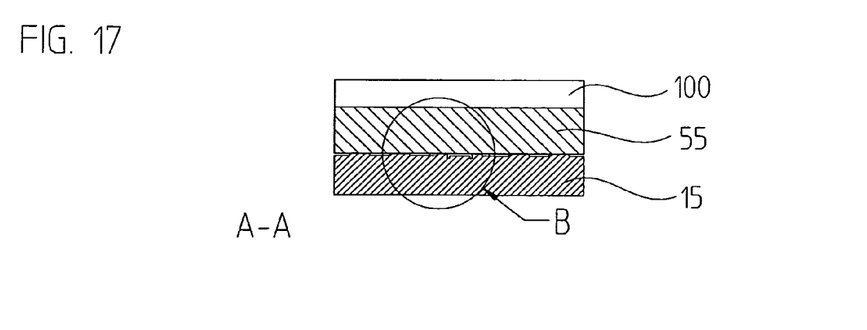
FIG. 17 is a cross-sectional view taken along the line A-A illustrated in FIG. 16.
Figure 18:
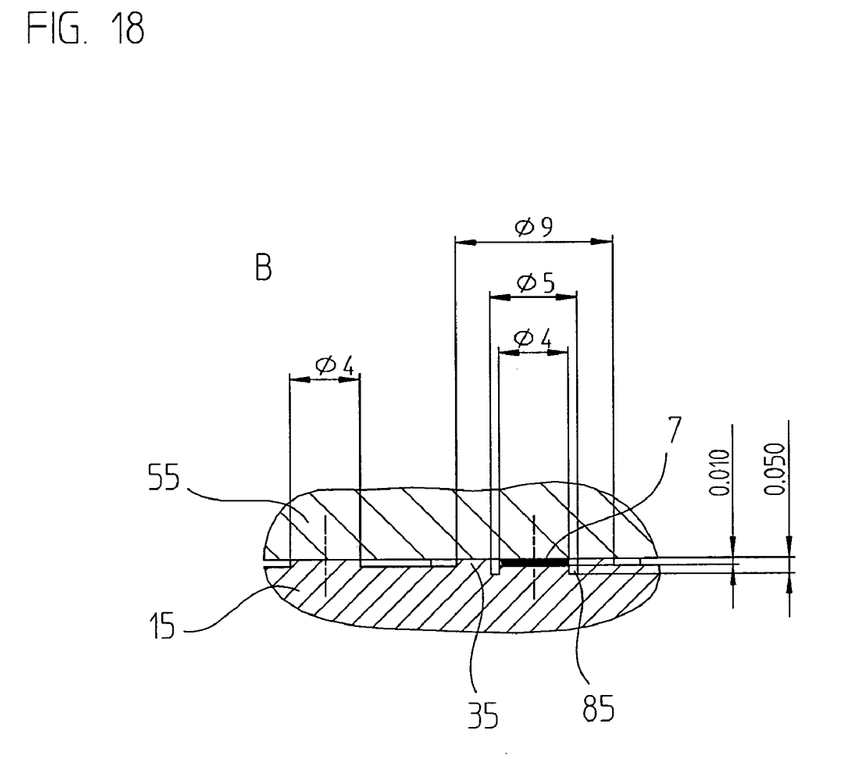
FIG. 18 is an enlarged view of region B illustrated in FIG. 17.
Figure 19:
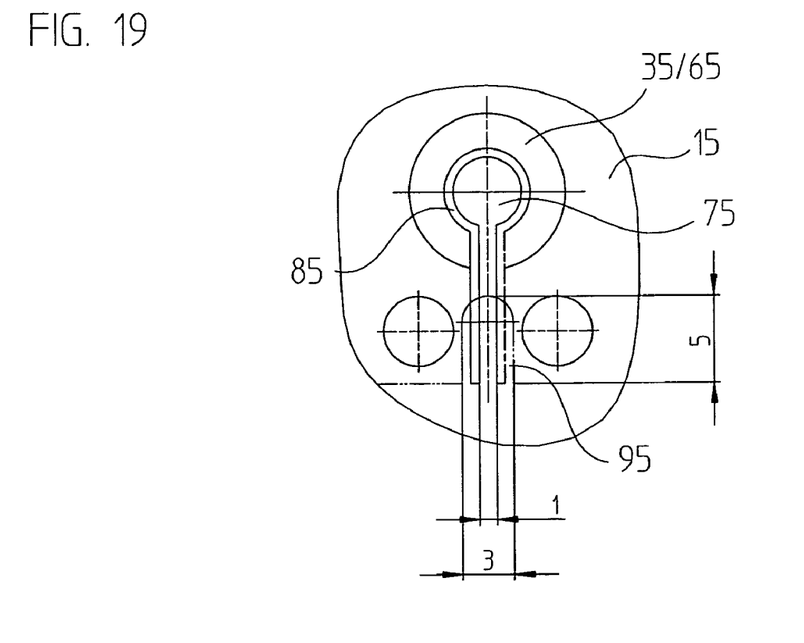
FIG. 19 is an enlarged view of region C illustrated in FIG. 16.

In FIGS. 4 and 5, such a scale 12 having a two-dimensional measuring graduation marking 22, also referred to as a cross grating, is illustrated as an example. Projections 32 having optically contactable surfaces 62 are formed on the surface of scale 12 facing carrier 52. These projections 32 may be spatially distributed two-dimensionally, either in a geometrically uniform manner in a normal grid, or in a statistical distribution. Projections 32 may each be circular, having a diameter of, e.g., less than 30 mm, e.g., 200 µm to 4 mm, and having a mutual spacing, e.g., less than the thickness of scale 12, the mutual spacing being the edge spacing, i.e., 4 mm in FIGS. 11 and 16. The height of projections 32 may be greater than, e.g., 10 nm, for example, 20 nm to 50 µm. The flatness (waviness) of surfaces 62 of projection 32 may be in the range of less than, e.g., 500 nm on a diameter of approximately 10 mm, e.g., 30 nm per 0.10 mm. Surfaces 62 of projections 32 formed as optically contacting surfaces are arranged in a common plane. Typical values of the thickness of scale 12 are, e.g., 1 mm to 15 mm. The lower the diameter of projections 32, and the lower the mutual spacing, the lower the height of projections 32 may also be.

The two-dimensional, spatial distribution of projections 32 may be implemented such that, between projections 32, opening channels 200 are formed which extend, relative to the X-Y plane, to the edge of scale 12. This measure permits surface-active agents to escape easily from the space between scale 12 and carrier 52 after the optically contacting process. In addition, trapped air over the entire surface of scale 12 is able to escape easily via opening channels 200, thus increasing the bonding strength and providing good planarity of scale 12.

Projections 32 constitute a type of nub and are formed so that the edges, which are transitions to the depressions next to them that form opening channels 200, are rounded off. In this manner, surfaces 62 to be optically contacting may be more effectively cleaned and, if desired, surface-activated. An additional aspect is that contact points for separation may be prevented and the risk of material splintering off may be substantially reduced.

For maintenance, the optically contacting bond may be broken by introducing a medium, e.g., compressed air, through at least one bore in carrier 52 or in scale 12, into the gap of scale 12 and carrier 52, thereby generating a pressure that forces scale 12 and carrier 52 apart.

For example, for scales 13 jutting out past carrier 53 (illustrated, for example, in FIGS. 6 and 7), there is the risk that induced vibration may cause the edge regions of scale 13 to alternately peel off and come together again. This event leads to unpredictable change in the short-period variation in length of the projecting scale region. Additional measures may be provided for preventing this.

Figure 6:
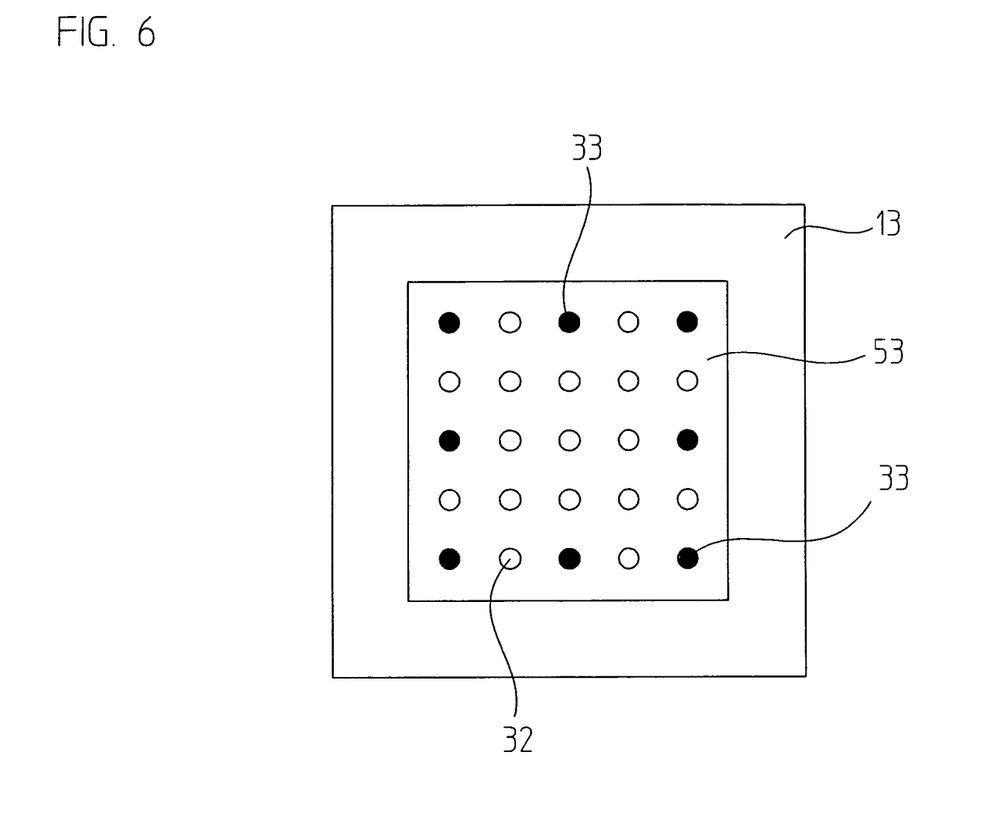
FIG. 6 is a top view of a third carrier and a third scale.
Figure 7:
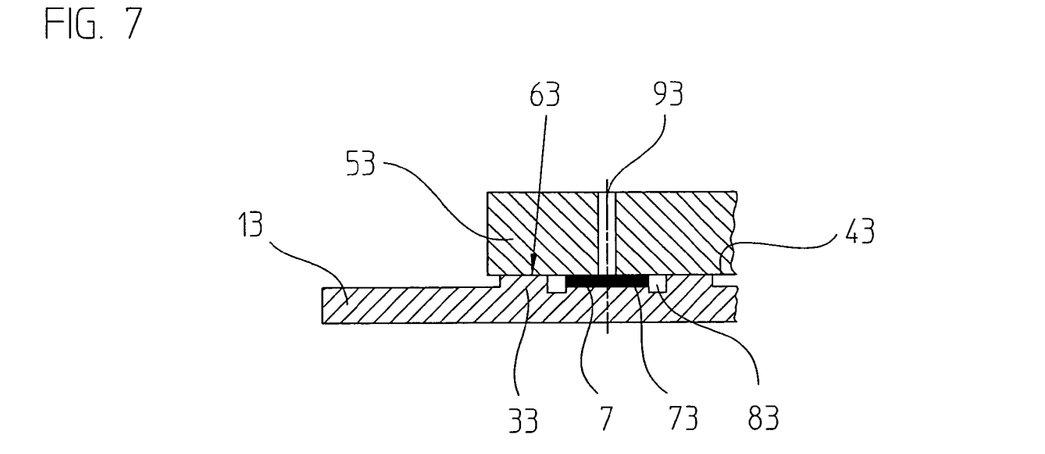
FIG. 7 is a cross-sectional view of the scale illustrated in FIG. 6 attached to the carrier.

Thus, an additional safety mechanism may be provided for supporting scale 11 to 15 at carrier 51 to 55. This additional safety mechanism may include retaining elements in the form of springs, retaining clips, magnetic retaining elements, electrostatic clamp circuit, vacuum holding devices, etc., or adhesive holding devices such as oil films, etc., or adhesive bonding methods, etc., may be used. This additional safety mechanism may be implemented at least at the edge region of the optically contacting joint, i.e., at the edge region of scale 13 and/or carrier 53, e.g., at the edge region of the overlap of scale 13 and carrier 53.

Particularly suitable adhesive joints for supplementing the optically contacting are explained below with reference to FIGS. 6 to 19. In this context, the surface pressure between connection partners 13 and 53 is increased with the aid of adhesive agent 7, by prestressing discrete optically contacting surfaces 63, e.g., in the edge zone of the connection of scale 13 and carrier 53.

Fastening with the aid of adhesive agent 7 prevents the breaking-off and loss of scales 13, for example, from inadvertent contact by an installer.

In this context, the adhesive layer produces deformations of scale 13, which are, at most, locally minimal. Position and flatness are still extremely precise and largely drift-free due to the optically contacting joint.

FIG. 6 illustrates a scale 13 protruding from carrier 53 at edge regions. Some of annular projections 33 of scale 13 are additionally provided with a cementing point, of which a cross-section of one is illustrated in FIG. 7. To differentiate the projections 32 that are only optically contacted and the projections 33 that are additionally secured by adhesive agent 7, these are provided with different reference numerals, and projections 33 secured by adhesive agent 7 are represented in black in FIG. 6. For projections 33 additionally fastened by adhesive agent 7, a circular adhesive surface 73, which is separated from optically contacting surface 63 by a grooved depression 83 in the form of an adhesive stop, is arranged inside annular optically contacting surface 63. This prevents adhesive agent 7 from reaching optically contacting surface 63 when it is introduced.

For clarity, the measuring graduation marking is no longer illustrated.

The regions lying deeper than optically contacting surface 63, i.e., adhesive surfaces 73 and depressions 83, are produced, for example, in a lithographic manner. Possible alternatives include mechanical machining, e.g., milling, or, for a suitable material, laser machining.

Adhesive surface 73 and the E-module of adhesive agent 7 should only kept as large as absolutely necessary, in order to keep the bending deformation of scale 13 due to tensile forces after the curing of the adhesive agent only as large as necessary, but as small as possible. Tensile forces are caused by shrinkage of adhesive agent 7.

Figure 8:
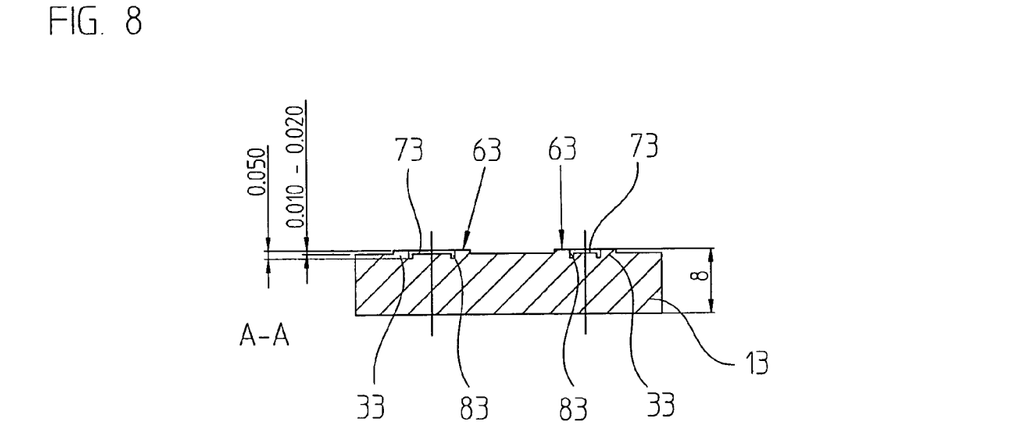
FIG. 8 is a cross-sectional view of two alternatives drawn side-by-side for forming the third scale.
Figure 9:
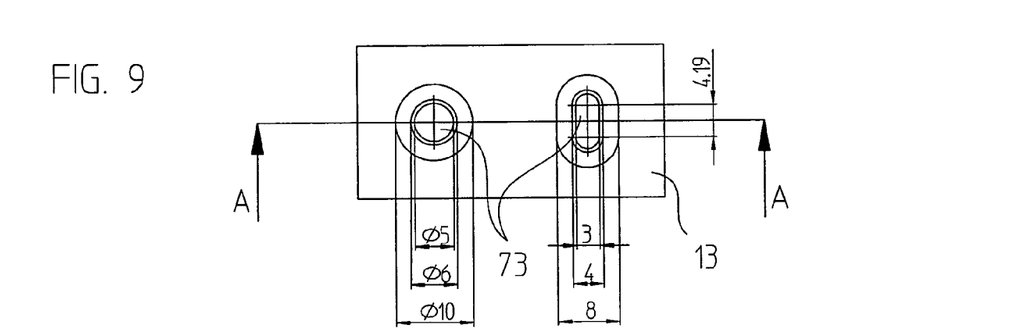
FIG. 9 is a top view of the two alternatives illustrated in FIG. 8.
Figure 10:
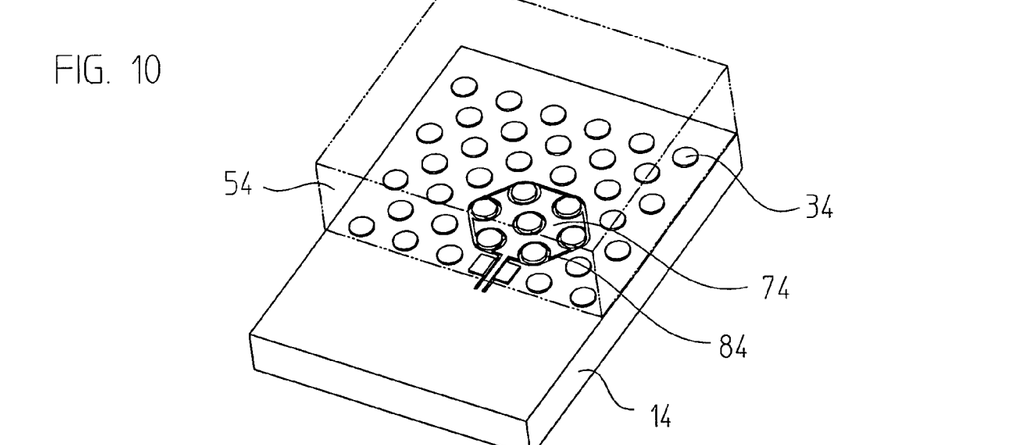
FIG. 10 illustrates a fourth carrier and a fourth scale.

Given the same size of adhesive surface 73, negligible, short-period deflection of scale 13 may also be attained using an oval shape of optically contacting surface 63 and adhesive surface 73, illustrated, in each instance, on the right side. Regardless of the structural arrangement, the goal is to absorb the forces applied by adhesive agent 7 upon curing, as all-around as possible, and at a support distance as small as possible, which is provided by the projection or optically contacting surface 63 surrounding adhesive surface 73.

A method for optically contacting and adhesive fastening includes: bringing scale 13 into contact with carrier 53; aligning scale 13 on carrier 53, the alignment being able to be facilitated by, for example, introducing a gas, e.g., air, through bore 93 into the gap of scale 13 and carrier 53 in order to prevent optically contacting in this state; pressing scale 13 against carrier 53, and therefore optically contacting scale 13, in the aligned state, the pressing being able to be generated by producing a vacuum (evacuation) in the gap of scale 13 and carrier 53; and introducing adhesive agent 7 to adhesive surface 73 via bores 93 in carrier 53.

In order to prevent deformation of scale 13 during measuring operation, due to shrinkage or swelling of adhesive agent 7, e.g., caused by a change in air humidity, bore 93 may be sealed air-tight after introduction of adhesive agent 7. As an alternative, after optically contacting has occurred, a gas having a defined humidity (e.g., nitrogen, helium, etc.) may be directed through bore 93 into the gap of scale 13 and carrier 53, and therefore to adhesive surfaces 73, in order to prevent deterioration of adhesive agent 7.

When a suitable adhesive agent 7 is used, the adhesive-secured optically contacting joint may be separated, e.g., for maintenance, by, for example, heating the adhesive agent 7 or cracking it with the aid of light of a defined wavelength, or using chemical agents. For separation by heating, a heating rod may be inserted into bore 93 in order to locally heat adhesive surface 73. For separation by use of a chemical solvent, this may also be introduced through bore 93.

Alternatively, or in addition, a pressure may be generated in the gap of scale 13 and carrier 53, via bore 93, in order to separate the optically contacting joint.

The following examples described with reference to FIGS. 10 to 19 illustrate alternatives that facilitate the introduction of adhesive agent 7.

As illustrated in FIGS. 10 to 14, adhesive agent 7 is dosed from the edge of scale 14 and carrier 54 and is drawn to adhesive surface 74 by capillary forces. Grooved or groove-shaped depressions 84 between surfaces 64 of nub-shaped projections 34 and adhesive surfaces 74 prevent the adhesive agent from contacting optically contacting surface 64.

Support is provided by optically contacting surfaces 64 in direct proximity to the dosing channel and inside the adhesive region, formed by adhesive surfaces 74. Depressions 84 prevent adhesive agent 7 from contacting optically contacting surfaces 64 (detachment due to drawn-in adhesive agent 7 is prevented).

As illustrated in FIGS. 15 to 19, a slot 95, which is used for introducing adhesive agent 7 to adhesive surface 75, is introduced into carrier 55. Adhesive agent 7 is drawn by capillary action from slot 95 to adhesive surface 75. In this manner, a shrinking adhesive point on the protruding region of scale 15 is prevented, and adhesive agent 7 cannot pull protruding scale 15 down.

Figure 15:
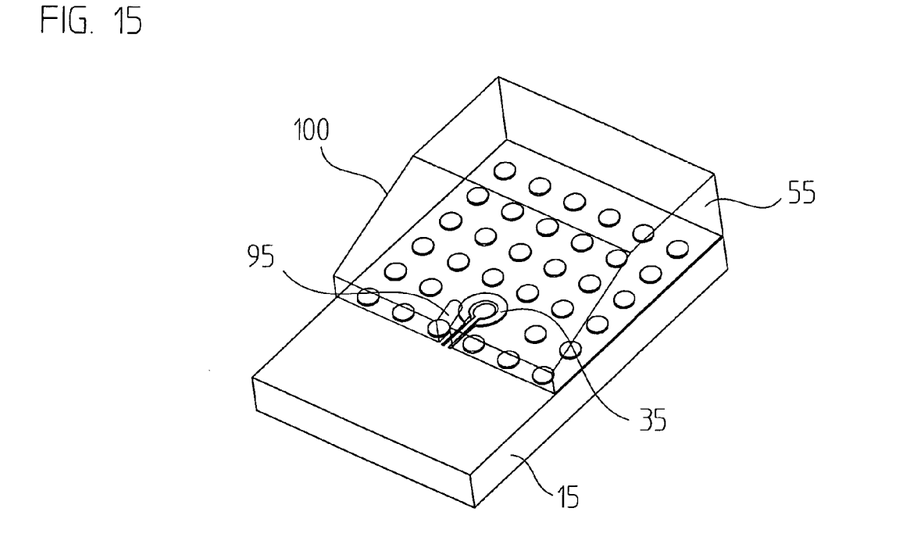
FIG. 15 illustrates a fifth carrier and a fifth scale.

Carrier 55 may have a taper 100 in the direction of the edge. This renders carrier 55 more flexible, and it undergoes the deformation of protruding scale 15 along with it. The risk of separation in the edge region may thereby be reduced. An exemplary embodiment is illustrated in FIG. 15.

A taper 100 of the edge region of carrier 51 to 55 may be used, with or without adhesive fixing, for improving the optically contacting stability.

Contact surfaces 63 to 65, which are formed by projections 33 to 35 and surround adhesive surface(s) 73 to 75, may be positioned about adhesive surface 73 to 75 as symmetrically as possible. This keeps the deformation of the scale graduation marking surface small as well.

Channels 200 leading to the outside separate nub-shaped projections 31 to 35 from each other in an otherwise planar optically contacting surface (providing, e.g., escape of the air from the gap, improvement of the optically contacting behavior). Several combinations of surfaces/nubs/grooves having, or not having, adhesive-stop depressions 83, 84, 85 are possible.

In order to protect the optically contacting joints from external effects and creeping-under, the gap between scale 11 to 15 and carrier 51 to 55 may be sealed, after generation of the optically contacting joint, by sealing the edge at the periphery of scale 11 to 15. Varnishes or adhesive agents may be used for this purpose. Protection may also be achieved by flooding the gap with a medium, for which purpose a gas having defined properties, for example, is introduced into the space between projections 31 to 35, i.e., into channels 200, and flows through it.

In the above-mentioned examples, projections 31 to 35 set apart from one another are formed in one piece on scale 11 to 15 in the form of nubs. Alternatively or additionally, projections 31, 35 may also be formed on carrier 51 to 55. Projections 31 to 35 may also be formed by a layer deposited on scale 11 to 15 or carrier 51 to 55 and patterned.

The form and arrangement of projections 31, 35 are not limited to the arrangements shown.

When working with at least approximately square or round scales, the projections may form a kinematically determined support, in that only three projections are provided, distributed in one plane.

The optically contacting methods have in common that surfaces 61 to 65, 41 to 45 to be joined are brought toward each other in close contact until they are a few interatomic distances apart, in order to either be able to be attracted due to the power of the van der Waals forces (direct bonding), or else to be able to produce an atomic bond by the formation of a few atomic layers in the form of an intermediate bond (LTB, anodic bonding).

The dimensions specified in the drawings are indicated in mm and only show the orders of magnitude schematically.

What is claimed is:

1. A method for attaching a scale to a carrier, comprising: producing an optically contacting bond between the scale and the carrier at a plurality of surface regions distributed in a two-dimensional grid spaced apart from each other and separated from each other by at least one channel.

2. The method according to claim 1, wherein the optically contacting bond is produced in the producing step by at least one of (a) direct bonding, (b) low-temperature bonding and (c) anodic bonding.

3. The method according to claim 1, wherein the surface regions include projections having a mutual spacing of less than a thickness of the scale.

4. The method according to claim 1, further comprising producing a further connection in addition to the optically contacting bond.

5. The method according to claim 4, wherein the further connection includes an adhesive joint, the further connection producing step including introducing an adhesive agent between the scale and the carrier.

6. A device, comprising:
a scale; and
a carrier, the scale attached to the carrier by an optically contacting bond;
wherein the optically contacting bond is provided at a plurality of surface regions distributed in a two-dimensional grid set apart from each other and separated from each other by at least one channel.

7. The device according to claim 6, wherein the surface regions include projections provided on at least one of (a) the scale and (b) the carrier.

8. The device according to claim 6, wherein the projections have a mutual spacing of less than a thickness of the scale.

9. The device according to claim 6, wherein the scale and the carrier are connected by a further connection in addition to the optically contacting bond.

10. The device according to claim 9, wherein the additional connection includes an adhesive joint, an adhesive agent provided on adhesive surfaces between the scale and the carrier.

11. The device according to claim 10, wherein the adhesive surfaces are separated from projections provided on at least one of (a) the scale and (b) the carrier by grooved depressions.

12. The device according to claim 11, wherein the carrier directly contacts the scale at the projections, the adhesive surfaces recessed with respect to the projections to provide a gap between the scale and the carrier adapted to receive the adhesive agent, the grooved depressions recessed with respect to the adhesive surfaces.

13. The device according to claim 10, wherein the carrier includes at least one opening adapted for introduction of the adhesive agent onto the adhesive surface.

14. The device according to claim 10, wherein the adhesive surface extends to an edge of at least one of (a) the scale and (b) the carrier and is formed so that the adhesive agent travels by capillary force from the edge to adhesive surfaces arranged away from the edge.

15. A comprising:
a scale; and
a carrier, the scale attached to the carrier by an optically contacting bond;
wherein the optically contacting bond is provided at a plurality of surface regions of the scale set apart from each other and separated from each other by at least one channel; and
wherein the carrier includes a taper in a direction of an edge.

16. A scale, comprising:
an attachment surface adapted for attachment to a carrier, the attachment surface including projections set apart from each other and distributed in a two-dimensional grid, each projection including an optically contactable surface adapted to produce an optically contacting bond to an opposing surface of the carrier.

17. The scale according to claim 16, wherein the projections have a mutual spacing of less than a thickness of the scale.

* * * * *